United States Patent [19]
Clayton et al.

[11] Patent Number: 4,852,216
[45] Date of Patent: Aug. 1, 1989

[54] ANIMAL SLAUGHTERING CHEMICAL TREATMENT AND METHOD

[75] Inventors: R. Paul Clayton, Greeley; Rod A. Bowling, Fort Collins, both of Colo.

[73] Assignee: Monfort of Colorado, Inc., Greeley, Colo.

[21] Appl. No.: 3,855

[22] Filed: Jan. 16, 1987

[51] Int. Cl.$^4$ ............................................... A22B 5/00
[52] U.S. Cl. ............................................ 17/50; 17/51
[58] Field of Search ..................... 426/332, 521; 17/50, 17/51

[56] References Cited

U.S. PATENT DOCUMENTS

| | | | |
|---|---|---|---|
| 3,934,044 | 1/1976 | Busch et al. | 426/326 |
| 3,958,020 | 5/1976 | deVries | 426/332 X |
| 4,191,787 | 3/1980 | Bauermann | 426/332 X |
| 4,305,966 | 12/1981 | Ueno et al. | 426/332 X |
| 4,431,679 | 2/1984 | Crawford | 426/332 |
| 4,670,277 | 6/1987 | Brotsky et al. | 426/332 X |

FOREIGN PATENT DOCUMENTS

WO83/03522 10/1983 World Int. Prop. O. ......... 426/332

Primary Examiner—Willie G. Abercrombie
Attorney, Agent, or Firm—David S. Woronoff

[57] ABSTRACT

A material and method for processing meat in production in which the meat, both carcass and head, which can proceed on different production lines, is rinsed and treated with acetic acid after hide removal. The water and acid are maintained at a temperature of between 80 and 150 degrees fahrenheit. The acid is in a water based solution at concentrations ranging from 0.25 per cent to 2.00 per cent. After evisceration for the carcass and removal of waste from the head, the head and carcass are rinsed and treated with acetic acid again before being sent to cold storage from which they are released later for further processing. The first rinsing step is commenced within one hour of the time the hide is removed from the animal.

18 Claims, 3 Drawing Sheets

ANIMAL SLAUGHTERING CHEMICAL TREATMENT AND METHOD

FIELD OF THE INVENTION

The present invention relates to the field of the treatment of the carcass of slaughtered animals, particularly cattle. In a modern high-output meat packing plant, 3200 to 7000 animals can be processed per day at a rate which exceeds 400 per hour per production line.

Modern production facilities have the ability to produce more than 1,000,000 pounds of ground meat and other less fragile products each day. Modern inspection and processing procedures are sufficient to insure that all products (intended for human consumption) which leave the processing plant are in good condition for that use. However, subsequent handling can introduce or promote the growth of undesirable bacteria which can cause the packed product to look or be unfit for human use.

All such packed products have a "shelf-life" during which time they can be sold and used as food and after which they must be discarded. The present invention greatly extends the shelf-life of packed products, especially beef, and improves the resistance of the packed products to mishandling during the distribution cycle.

Mishandling meat products during the distribution cycle is a leading cause of damaged product. The most delicate product is ground meat because of the vast increase in surface area exposed and the vast increase in handling required as compared to other cuts of meat. The damage to meat products during the distribution cycle can be greatly reduced, if the meat at the beginning of the cycle is relatively bacteria free.

The primary animal sources of meat in the Western World and especially the United States are beef, pork, lamb and calves. All of these animals are host to a wide variety of natural bacteria in their oral cavities, intestinal tracts and skin. An important aim of every slaughterhouse is to prevent contamination of the carcass by the bacteria naturally present on and in the animal.

There has been some work in the field of sanitizing meat including treatment with ultra-violet light, spraying with water, acetic acid, sodium hypochlorite and chlorinated water. None of these systems have been without problems. Ultra-violet light did not sufficiently control bacteria to be effective. Any sanitizing meat treatment must be sufficiently selective because certain bacteria are necessary for characteristic flavor development of meat which enhances its taste. Acetic acid has been experimented with at levels in the 3% and 4% range with promising results in laboratory conditions on cut meat and not whole carcasses. Tests using sodium hypochlorite have shown no useful result.

SUMMARY OF THE PRESENT INVENTION

The present invention discloses a novel disinfection system for use in a high volume production line processing from 3200 to 7000 animals per day. The invention uses a dual wash system for the head on one line and the remainder of the carcass on the other line. The wash itself is a dual one with water in a specified temperature range and with a controlled delivery rate and pressure followed by treatment with dilute acetic acid ranging from about 0.25 to 2.00 per cent concentration. The washes with water and acid are performed immediately after hide removal and then again immediately after evisceration. The carcass then proceed to the cold room for storage prior to further butchering.

The novel chemicals and process steps produce striking reductions in bacteria levels and increases in shelf life. Shelf life rises from 25 to 30%. Discoloration and slime formation are vastly reduced.

DESCRIPTION

Figure 1:
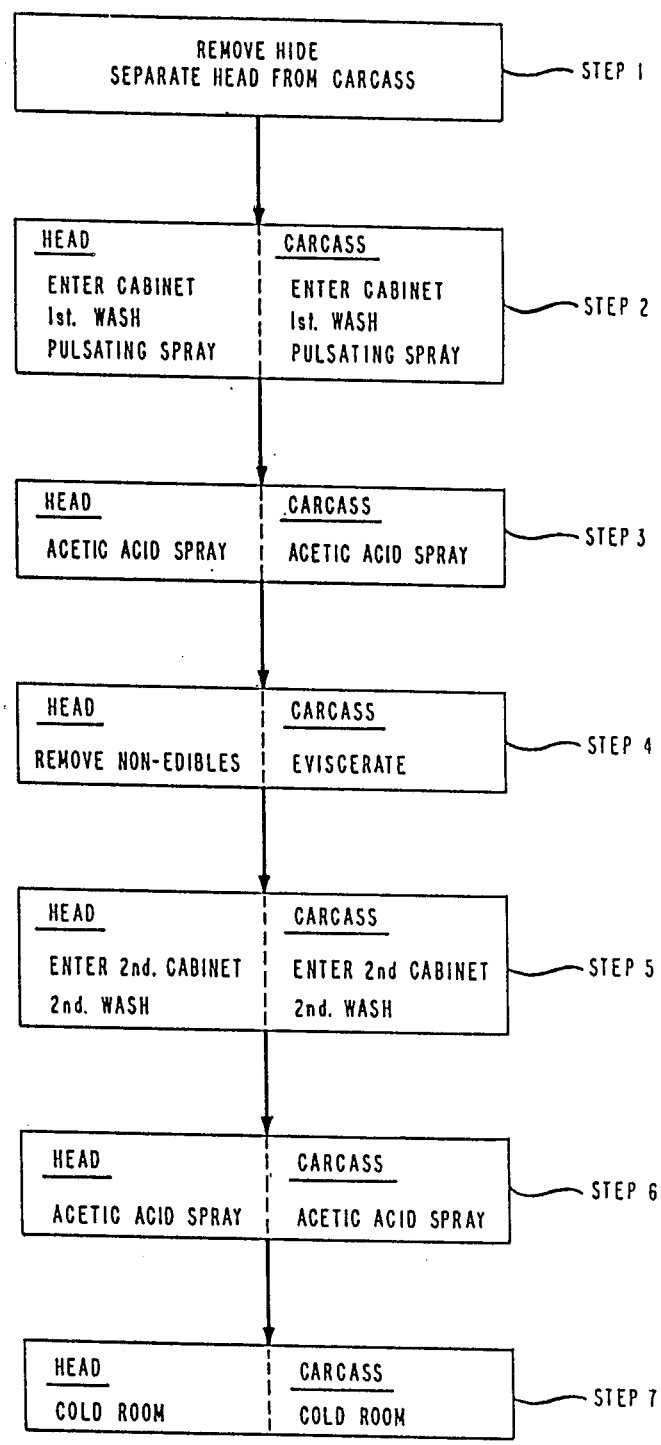
FIG. 1 shows a flow chart showing an embodiment of the present inventive method.

A clear understanding of the present invention can be gained from reviewing the flow chart shown in FIG. 1. Before step 1, the animal is killed and hung head down from a hook. As shown in step 1, the animal's hide is removed and the head is separated from the carcass and placed on a separate production line 1 (which can run near to that of the main carcass).

The time from hide removal to the time of treatment is exceedingly important. The bacteria present in the carcass are active and will not respond to the treatment after about one hour from removal of the the hide. In order to control the initial level of bacteria, it is desireable to start treatment within fifteen to thirty seconds after removal of the hide and consequent exposure of the fat directly under the hide. The treatment which follows is of limited value if performed more than one hour after removal of the hide.

Figure 2:
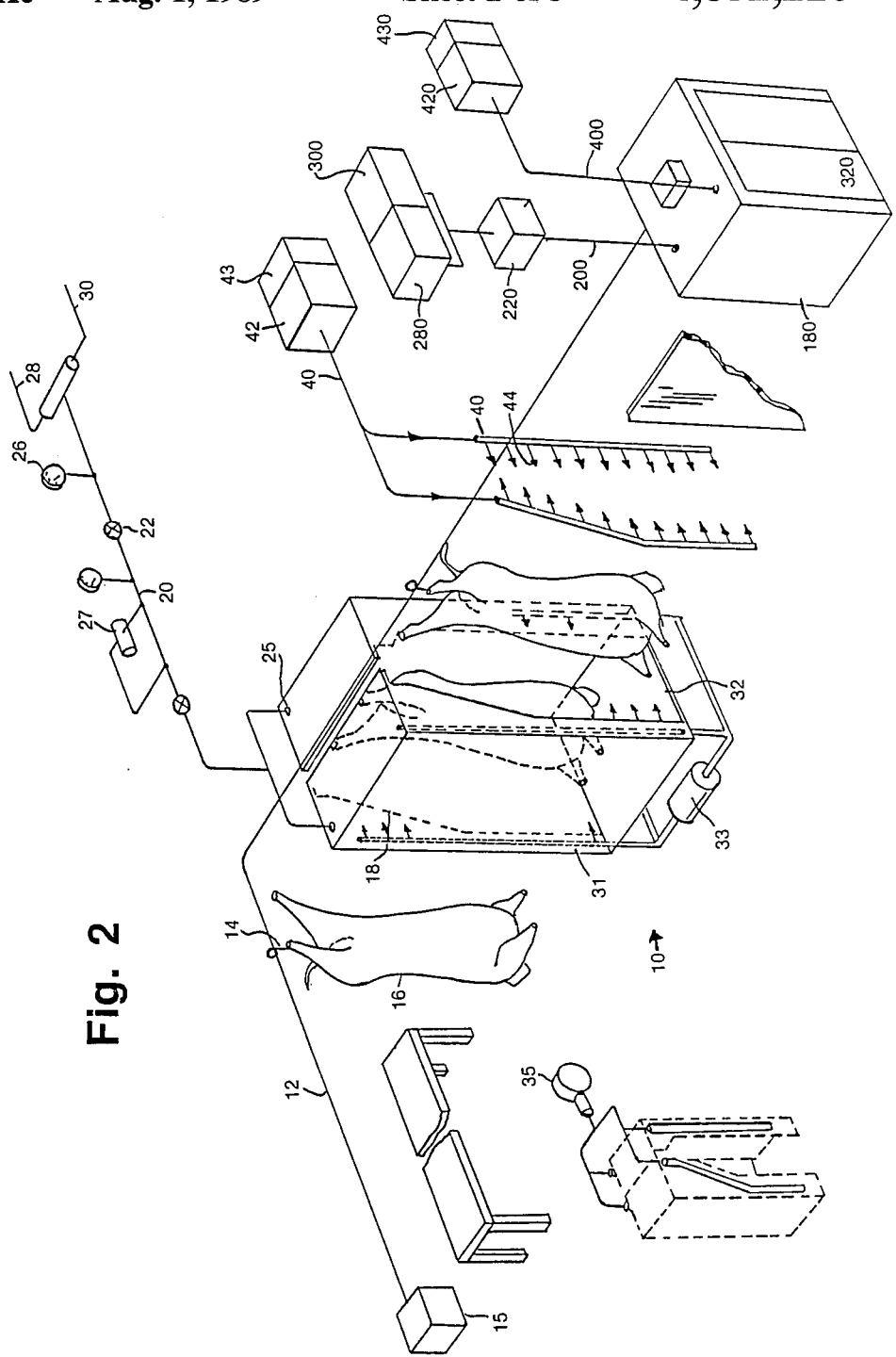
FIG. 2 shows a perspective view of a spray cabinet forming a part of the present invention.
Figure 3:
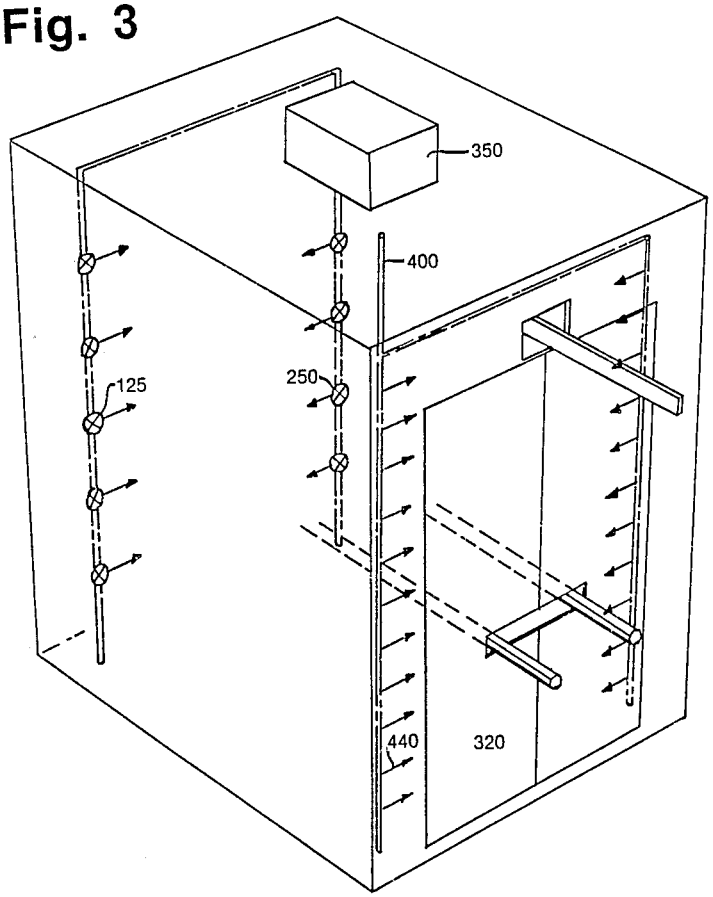
FIG. 3 shows a perspective view of another spray cabinet forming a part of the invention.

The head and the carcass, each on its own production line enter a cabinet which is closed possibly by air curtains and has a reduced pressure. Each is rinsed by a pulsating spray of water ranging from 80 degrees to 150 degrees fahrenheit. The source of the pulsating spray is oscillating as shown in FIGS. 2 and 3. After the warm water wash, the head and carcass pass before a spray of acetic acid maintained from 80 degrees fahrenheit to 150 degrees fahrenheit as shown in step 3. The duration of each spray is about 9.0 seconds, however a proper range for such a spray is about 5 to 25 seconds. During the acetic acid spray each carcass and head receive about 0.15 gallons of acetic acid. The closed chamber prevents the escape of the acetic acid and keeps more of the acid on the meat to be treated.

After the first wash and acid treatment, the head and carcass have the inedible parts removed as shown in step 4. Each then enters a second washing chamber for a spray wash and second acetic acid treatment as shown in steps 5 and 6. The head and carcass are then sent to a cold room maintained at about 32 degrees fahrenheit for about 24 hours of storage before further processing.

Figure 4:
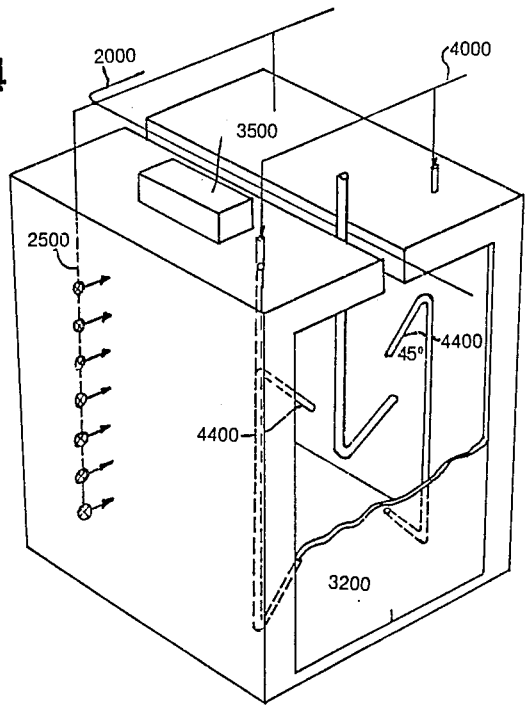
FIG. 4 shows a perspective view of another spray cabinet forming a part of the invention.

The structural details of the production lines are shown in FIG. 2, 3 and 4. A rail 12 has hooks 14 for suspending a carcass 16. The rail 12 is moved by a motor 15 and moves the carcass to a first washing chamber 18 which has doors 31 and 32 for containing the material within the washing chamber 18. The doors may be air curtains which are well known in the art.

Within chamber 18 is an exhaust system 35 for maintaining a reduced pressure within the chamber when the doors are closed. Hot and cold water regulator valves 28 and 30 control the temperature of the incoming water. The desired temperature range is from 80 to 150 fahrenheit depending on the product being processed. A range of about 110 to about 130 degrees fahrenheit appears optimum for beef.

The water at the desired temperature passes through a pressure regulator valve 22 and a pulsator assembly which is commercially available to a line 20 for connection to oscillating delivery heads 25 which are arranged in an array. Delivery pressure is maintained at about a range of 10 to 100 pounds per square inch.

Also within the cabinet 18 is a fluid line 40 which leads to an array of heads 44 for spraying the dilute acetic acid on the carcass. Line 40 leads to a tank 42 which contains the acetic acid. A pump 43 when activated pumps the dilute solution to the carcass at a rate of about 0.15 gallons per carcass.

Cabinet 180 which is downstream of cabinet 18 is substantially similar. Parts in cabinet 180 which are like those in cabinet 18 have the same number folowed by the numeral "0". The only significant difference between the spray cabinets 18 and 180 is that cabinet 180 does not have an oscillating array of sprinkler heads 125.

FIG. 3 is similar to FIG. 2; parts in FIG. 3 which are like those in FIG. 2 have the same number followed by a "0". Thus parts 18 and 180 are similar. FIG. 4 is similar to FIG. 2; parts in FIG. 4 which are similar to those in FIG. 2 have the same number followed by a "00".

The results of the present invention are shown clearly by the Summary in which charts have been normalized to show the control group values as 100. These charts which show tests on the loin, shank and hocks and 10, 20 and 30 day loin shelf life tests prove the value of the present invention.

TPC is the total plate count of bacteria on the meat per unit area. TCC is the total coliform bacteria count on the meat per unit area. Lactic acid bacteria which do not present a health hazard if eaten are important to be eliminated or kept low for consumer acceptance. Lactic acid bacteria are known to all for their presence in both sweet and sour. On meat, the sour smell is highly undesirable.

Normalization of the test results was achieved by using the control test result, subtracting from it the treatment test result and adding 100 and then dividing the number by the control test result.

It can easily be seen that the present invention achieves some highly important advances for the meat packing industry.

SUMMARY

HOCKS

| | 30 MINUTES | | | 24 HOURS | | |
|---|---|---|---|---|---|---|
| | TPC | TCC | E.COLI | TPC | LACTIC A. | LCD** |
| CONTROL | 100 | 100 | 100 | 100 | 100 | 100 |
| TEST 1 | 184 | 143 | 142 | 177 | 96 | 180 |
| TEST 2 | 149 | 103 | 137 | 137 | 21 | 150 |

LOIN

| | 30 MINUTES | | | 24 HOURS | | |
|---|---|---|---|---|---|---|
| | TPC | TCC | E.COLI | TPC | LACTIC A. | LCD |
| CONTROL | 100 | 100 | 100 | 100 | 100 | 100 |
| TEST 1 | 192 | 150 | 177 | 113 | 177 | 194 |
| TEST 2 | 195 | 156 | 156 | [699]* | [401]* | 207 |

SHANK

| | 30 MINUTES | | | 24 HOURS | | |
|---|---|---|---|---|---|---|
| | TPC | TCC | E.COLI | TPC | LACTIC A. | LCD |
| CONTROL | 100 | 100 | 100 | 100 | 100 | 100 |
| TEST 1 | 176 | 92 | 109 | 198 | [262]* | 187 |
| TEST 2 | 148 | 89 | 109 | 188 | [126]* | 220 |

| | 10 DAY LOIN | | | 20 DAY LOIN | | | 30 DAY LOIN | | |
|---|---|---|---|---|---|---|---|---|---|
| | TPC | LACT. | OFF O. | TPC | LACT. | OFF O. | TPC | LACT. | OFF O. |
| CONTROL | 100 | 100 | 100 | 100 | 100 | 100 | 100 | 100 | 100 |
| TEST 1 | 13 | 34 | 100 | 197 | 176 | 25 | 191 | 184 | [33]* |
| TEST 2 | [45]* | [162]* | 100 | 198 | 178 | 100 | 131 | 122 | 67 |

**LCD = LOG COUNT DIFFERENCE
*EXPERIMENTAL ERROR
LACT. = LACTIC ACID
OFF O. = OFF ODOR
[The normalized test results shown above are the result of taking the control test result, subtracting it from the treatment test result, adding 100 and then dividing by the control test result.]

What we claim is:

1. In a method for packing meat the steps comprising:
   removing the hide from the animal leaving a carcass;
   a first water rinsing of the carcass within one hour of removal of the hide, with water maintained from 80 to 150 degrees fahrenheit;
   a first spraying of the carcass, immediately after the first washing, with acetic acid spray;
   evisceration of the carcass;
   a second rinsing of the carcass, immediately, with water maintained from 80 to 150 degrees fahrenheit;
   a second spraying of the carcass with acetic acid spray, immediately after the second rinsing.

2. The method claimed in claim 1 including further:
   maintaining the concentration of the acetic acid spray from 0.25 per cent to 2.00 percent.

3. The method claimed in claim 1 including further: separating the head from the carcass.

4. The method claimed in claim 3 including further:
   a first water rinsing of the head with water maintained from 80 to 150 degrees fahrenheit;
   a first spraying of the head with acetic acid spray;
   removal of the inedible parts from the head;

a second rinsing of the head with water maintained from 80 to 150 degrees fahrenheit;
a second spraying of the head with acetic acid spray.

5. The method claimed in claim 1 wherein the step of the first water rinsing is commenced within 15 to 30 seconds from the time the hide is removed from the animal.

6. In a method for packing meat the steps comprising:
removing the hide from the animal leaving a carcass;
removing the head from the animal
a first water washing of the head with water maintained from 80 to 150 degrees fahrenheit;
a first spraying of the head with acetic acid spray;
removal of undesirable parts from the head;
a second washing of the head with water maintained from 80 to 150 degrees fahrenheit;
a second spraying of the head with acetic acid spray.

7. The method claimed in claim 6 wherein:
the acetic acid is in a concentration ranging from 0.5 to 2.00 percent.

8. The method claimed in claim 6 wherein:
the acetic acid is in a concentration ranging from 0.5 to 1.00 percent.

9. In a method for packing meat the steps comprising:
removing the hide from the animal leaving a carcass;
removing the head from the carcass;
processing the head and the carcass on separate production lines;
a plurality of first and second spraying means for spraying the carcass and the head with fluid;
first rinsing on the separate production lines of the head and carcass with a warm water solution;
first spraying of the head and the carcass with an acetic acid spray;
evisceration of the carcass;
removal of the inedible parts from the head;
second spraying of the head and carcass with a warm water solution;
second spraying of the head and carcass with an acetic acid solution.

10. The method claimed in claim 9 wherein the step of the first water rinsing is commenced within one hour from the time the hide is removed from the animal.

11. The method claimed in claim 9 wherein the step of the first water rinsing is commenced within 15 to 30 seconds from the time the hide is removed from the animal.

12. The method claimed in claim 6 wherein the step of the first water rinsing is commenced within one hour from the time the hide is removed from the animal.

13. The method claimed in claim 6 wherein the step of the first water rinsing is commenced within 15 to 30 seconds from the time the hide is removed from the animal.

14. The method claimed in claim 9 wherein the acetic acid solution is in the range of 0.50 to 2.00 percent.

15. The method claimed in claim 9 wherein the temperature of the warm water is in the range of 80 to 150 degrees fahrenheit.

16. The method claimed in claim 14 wherein the time of acetic acid spray is in the range of 5 to 25 seconds.

17. The method claimed in claim 15 wherein the animal processed is beef cattle and the warm water temperature is in the range of 110 to 130 degrees fahrenheit.

18. The method claimed in claim 9 including the further step of transferring the carcass and head to cold storage for a time.

* * * * *